United States Patent
Lommerts et al.

(10) Patent No.: US 7,595,356 B2
(45) Date of Patent: Sep. 29, 2009

(54) POLYMER MODIFIED BITUMINOUS BINDER WITH LOW EMISSIONS

(75) Inventors: Bert Jan Lommerts, Heerhugowaard (NL); Anton Nico van Loef, Leiden (NL); Martinus Rijk Verweij, Utrecht (NL)

(73) Assignee: Latexfalt B.V., Koudekerk A.D. Rijn (NL)

( * ) Notice: Subject to any disclaimer, the term of this patent is extended or adjusted under 35 U.S.C. 154(b) by 78 days.

(21) Appl. No.: 10/598,926

(22) PCT Filed: Mar. 18, 2005

(86) PCT No.: PCT/NL2005/000210

§ 371 (c)(1),
(2), (4) Date: Dec. 12, 2006

(87) PCT Pub. No.: WO2005/087869

PCT Pub. Date: Sep. 22, 2005

(65) Prior Publication Data

US 2008/0161451 A1    Jul. 3, 2008

(30) Foreign Application Priority Data

Mar. 18, 2004   (EP)   ................. 04075882

(51) Int. Cl.
*C08L 95/00*   (2006.01)
(52) U.S. Cl. ............. 524/62; 524/59; 524/228; 524/575; 524/578; 524/579
(58) Field of Classification Search .......... 524/59
See application file for complete search history.

(56) References Cited

U.S. PATENT DOCUMENTS

| | | | |
|---|---|---|---|
| 4,129,542 A * | 12/1978 | Matheson et al. | ............. 524/70 |
| 5,019,610 A | 5/1991 | Sitz et al. | |
| 6,156,113 A | 12/2000 | Pasquier | |
| 6,444,731 B1 * | 9/2002 | Memon | ............. 524/59 |

(Continued)

FOREIGN PATENT DOCUMENTS

DE   19519539 A1 *  12/1995

(Continued)

OTHER PUBLICATIONS

Machine translation of Hackel et al., DE19519539A1.*

(Continued)

*Primary Examiner*—Marc S Zimmer
*Assistant Examiner*—Nicole M Buie
(74) *Attorney, Agent, or Firm*—Gilberto M. Villacorta; Sunit Talapatra; Foley & Lardner LLP

(57) ABSTRACT

The invention relates to a bituminous binder composition comprising: (a) 60-99.75 wt. % bitumen; (b) 0.05-5.0 wt. % of an elastomer; (c) 0.1-30.0 wt. % of a mono-alkyl ester of a vegetate e oil or an animal oil; and (d) 0.1-5.0 of an amide additive; based on the total weight of the bituminous binder composition, and a process for preparing the bituminous binder composition. The inventions further relates to the use of the bituminous binder composition in surface dressing, in particular road construction, road renovation, joint filling and sealing purposes.

34 Claims, 3 Drawing Sheets

U.S. PATENT DOCUMENTS

2004/0033308 A1* 2/2004 Barthel et al. .............. 427/136

FOREIGN PATENT DOCUMENTS

| EP | 0568757 A1 | 11/1993 |
| WO | WO0073378 A1 * | 12/2000 |
| WO | WO 03/062315 A1 | 7/2003 |

OTHER PUBLICATIONS

Translation of Hackl et al., DE19519539.*
"Rapeseed", Wikipedia, the free encyclopida.htm, retrieved from internet May 8, 2009.*

* cited by examiner

POLYMER MODIFIED BITUMINOUS BINDER WITH LOW EMISSIONS

FIELD OF THE INVENTION

The present invention relates to bituminous binder compositions having an excellent temperature dependence of the viscosity making them extremely suitable for road construction purposes.

BACKGROUND OF THE INVENTION

Bituminous binder compositions are used in road construction in order to provide bonding between the aggregates or between the substrate and the aggregates. Various methods are employed for road construction using bituminous binder compositions and aggregates as is disclosed in for example U.S. Pat. No. 6,156,113, incorporated by reference herein.

Bituminous binder compositions may comprise bitumen, elastomers and/or solvents. The bitumen may either be straight run products or processed products (cf. Kirk-Othmer, Encyclopedia of Chemical Technology, 4th Ed., Vol. 3, pages 689-724).

Elastomers are usually added to the bituminous binder composition to improve properties, e.g. rutting resistance, of the bitumen. Reference is for example made to U.S. Pat. No. 4,242,246, incorporated by reference herein. Also cohesion of porous asphalt layers is improved thus reducing the degradation thereof by ravelling, i.e. separation of the aggregates from the asphalt surface. Finally, elastomers are necessary to obtain a strong, yet flexible and sufficiently plastic binding material. Although elastomers are sufficiently compatible with bitumen, they are detrimental to processability in that they cause a too high viscosity. In some cases this requires the addition of solvents and/or fluxing oils to lower the viscosity and to improve solubility of the elastomers in the bitumen and the processing and application of the bituminous binder composition.

In surface dressing applications first bituminous binder compositions are sprayed on the road surface followed by adding aggregates. Obviously, the viscosity of the bituminous binder composition must be sufficiently low to ensure proper processability and the formation of a uniform layer of the composition on the road surface. However, under these conditions solvents and/or fluxing oils that are necessary to control the viscosity lead to health, environmental and safety problems due to their high volatility and flammability. Vapours may for example be inhaled by operators. Also, vapours contribute to environmental pollution by photo-chemical oxidation (smog formation) and the greenhouse effect. Likewise, transport of such highly volatile and flammable solvents containing bituminous binder compositions becomes more and more restricted.

It is proposed in the art to replace highly volatile and flammable solvents by less volatile and flammable liquid products, e.g. vegetable oils. For Example, EP A 568.757, incorporated by reference herein, discloses the replacement of solvents with an animal and/or vegetable fat or oil and/or with a mixture of such substances. A binder prepared in this way is said to have the advantage over known binders that it does not contribute to atmospheric pollution. However, the use of such less volatile and flammable liquid products often leads to a too low softening point of the asphalt during its service life leading to "blackening up" of the asphalt layer.

"Blackening up" can be described as follows. When chippings in a chip seal layer are able to move and roll they will get covered by a binder layer. As a result, the road surface will acquire a relatively uniform surface of chippings and binding layer, said surface having a black appearance. The rolling of chippings may be caused by too low visco-elasticity of the binder as a result of either high road surface temperatures or poor thermal material properties. To prevent "blackening up", a binder must have a sufficiently high softening point in combination with the appropriate visco-elastic properties at the higher service temperatures, i.e. temperatures prevailing during hot summers.

Another feature related to "blackening up" is that rolling can occur when a too high amount of binder is used in comparison to the average size distribution of the chippings. Under high traffic loads or high environmental temperatures chippings penetrate the binder layer more and more and eventually are absorbed by the binder.

The disadvantage of "blackening up" can for example be avoided by including a cross-linkable polymer or curable solvent in the bituminous binder composition, said cross-linkable polymer or curable solvent being hardened under the influence of oxygen, UV radiation and transition metal catalysts. For example, U.S. Pat. No. 6,156,113 discloses a bituminous binder composition comprising bitumen, a fatty acid monoester and a catalyst, wherein the catalyst is a transition metal salt such as cobalt octoate, cobalt naphtenate and zirconium octoate. Such catalysts are also known in the art as siccatives. However, these transition metal salts have an adverse effect on the environment and are therefore less desirable. In many countries the use of such catalysts in construction materials is severely restricted by law or even prohibited by law because of their long term negative environmental impact. In addition, bituminous binder compositions have a low permeability for oxygen so that the cross-linking reaction proceeds relatively slowly. U.S. Pat. No. 6,156,113 discloses that a significant increase of the initial ring-and-ball softening point of the bituminous binder composition is only achieved after about 30 days (cf. in particular the Figure). Obviously, such bituminous binder compositions need a considerable period of time to attain the required strength and other required properties.

Another option for solving the problems associated with "blackening up" is to increase the temperature dependence of the properties of the bituminous binder composition. As will be clear to the person skilled in the art, a low viscosity is desired at high temperatures so that the bituminous binder composition can easily be applied during road construction whereas at low temperature, e.g. during service, a high viscosity is desired to ensure sufficient strength and adhesion.

WO 00/73378, incorporated by reference herein, discloses a storage stable bitumen binder composition comprising 75-99.95 wt. % of bitumen, 0 to 15 wt. % of an elastomer and 0.05-10 wt. % of an amide additive, preferably 85-99.4 wt. % of bitumen, 0.5-12 wt. % of the elastomer and 0.1-3 wt. % of the amide additive.

WO 030/062315, incorporated by reference herein, discloses a binder composition that can be used in asphalts wherein the binder composition comprises 1-70 wt. % of a resin, 20-97 wt. % of a lubricating oil or a lubricating oil extract and 0.1-3 wt. % of an amide additive. The resin is preferably an elastomer such as styrene-butadiene-styrene. The lubricating oil or lubricating oil extract may be selected from a wide range of products including those obtained from refinery processes and vegetable oils. However, it is preferred that the lubricating oil or lubricating oil extract is obtained by solvent extraction of a deasphalted oil, in particular a brightstock furfural extract. Table 1 of WO 030/062315 discloses that the addition of 1.0 wt. % of the amide additive ethylene bisstearamide (EBS) results in an increase of the ring-and-ball softening point of 4° C.

However, the bituminous binder compositions according to the prior art are still deficient in terms of the temperature dependence of the viscosity.

SUMMARY OF THE INVENTION

The present invention relates to a bituminous binder composition comprising:
(a) 60-99.75 wt. % bitumen;
(b) 0.05-5.0 wt. % of an elastomer;
(c) 0.1-30.0 wt. % of a mono-alkyl ester of a vegetable oil or an animal oil; and
(d) 0.1-5.0 of an amide additive;
based on the total weight of the bituminous binder composition.

DETAILED DESCRIPTION OF THE INVENTION

Figure 1:
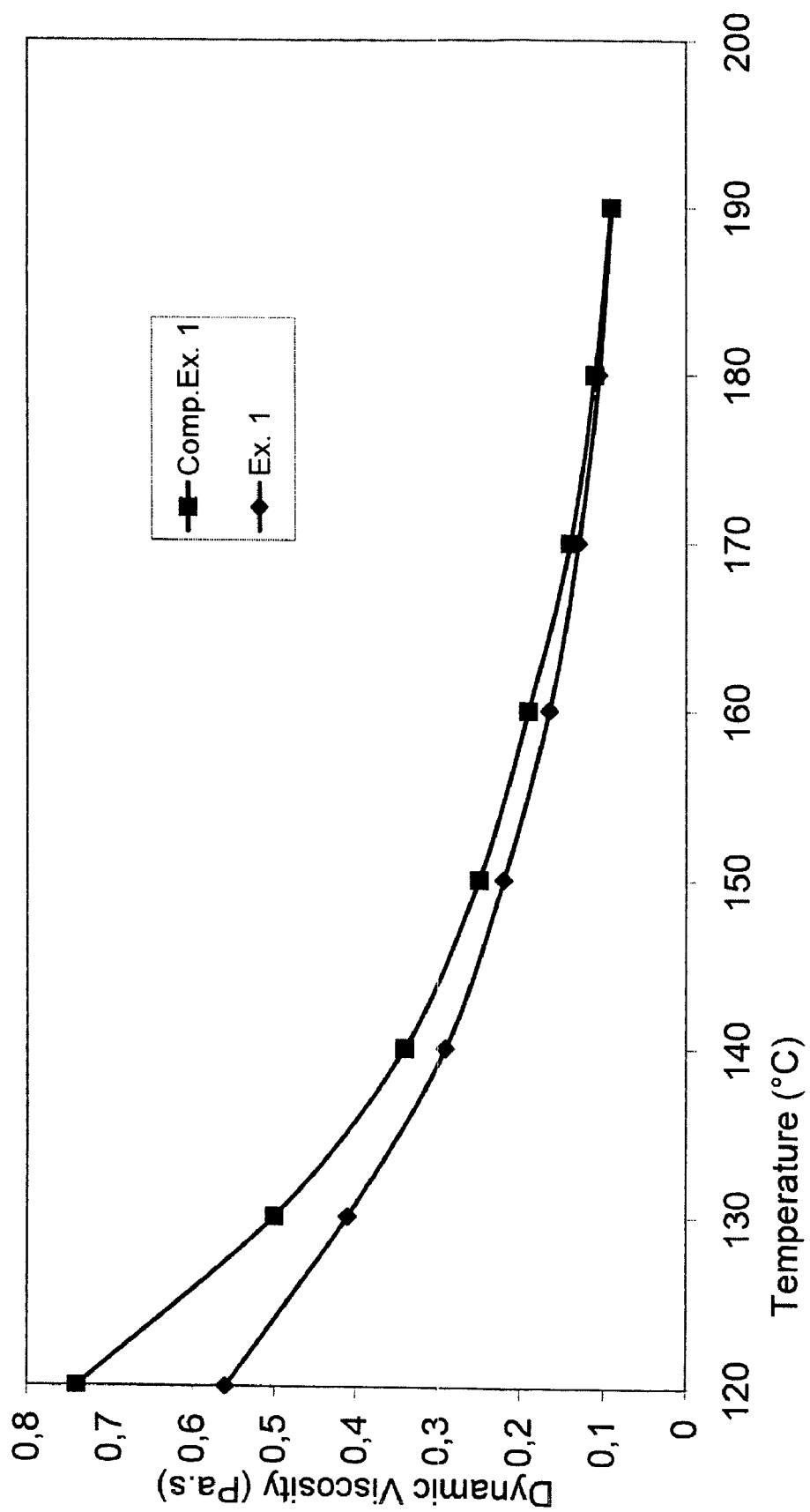
FIG. 1 shows the dynamic viscosity vs. temperature of a bituminous binder composition that does not contain component (d) and a bituminous binder composition according to the invention. It appears that at higher temperatures the viscosity of both compositions are comparable whereas at lower temperatures the composition according to the invention has a lower viscosity.

According to the invention it is preferred that component (a) of the bituminous binder composition is a paraffinic or a naphtenic bitumen with an average penetration of 10 to $350 \cdot 10^{-1}$ mm, preferably 70 to $220 \cdot 10^{-1}$ mm, according to ASTM D5-97.

Component (b) of the bituminous binder composition according to the invention can for example be an ethylene-vinyl acetate copolymer, a polybutadiene, an ethylene-propylene copolymer, an ethylene-propylene-diene terpolymer, a butadiene-styrene diblock copolymer, a styrene-butadiene-styrene (SBS) triblock terpolymer, a isoprene-styrene diblock copolymer or a styrene-isoprene-styrene (SIS) triblock terpolymer. However, according to the present invention, it is preferred that the elastomer is a polymer or a resin comprising two adjacent, optionally substituted butadiene units such as isoprene, most preferably a polybutadiene, a butadiene-styrene diblock copolymer, a styrene-butadiene-styrene triblock terpolymer, a isoprene-styrene diblock copolymer or a styrene-isoprene-styrene triblock terpolymer. More preferably, the elastomer is a polybutadiene, in particular because of its good compatibility with bitumen and its excellent visco-elastic properties.

Current practise is to add the desired level of a single elastomer, sometimes along with a curing agent that promotes cross-linking of the elastomer, until the desired properties are met. However, cost of the elastomer adds significantly to the overall cost of the resulting bitumen binder composition. In addition, at increasing levels of elastomer concentration, the working viscosity of the bitumen binder composition becomes excessively great and separation of bitumen and elastomer may occur.

In the bituminous binder composition according to the present invention the elastomer content can be at an economically advantageous low level which is still able to modify the properties of the binder composition favourably. The bituminous binder composition according to the invention comprises preferably 0.1 to 4.5 wt. %, more preferably 0.2 to 4.0 wt. %, of the elastomer, based on the total weight of the bituminous binder composition.

According to the invention, component (c) of the bituminous binder composition is a mono-alkyl ester of a vegetable or animal oil. Preferably, the mono-alkyl ester comprises a $C_1$-$C_4$ alkyl ester of an unsaturated fatty acid. The alkyl group may be linear or branched. Suitable examples of the alkyl group encompass methyl, ethyl, n-propyl, i-propyl, n-butyl, s-butyl and t-butyl. Preferably, the alkyl group is methyl or ethyl and most preferably methyl. Suitable examples of the vegetable oil are sunflower oil, lineseed oil and rapeseed oil. However, it is preferred that the vegetable oil is rapeseed oil or (isomerised) sunflower oil. Preferably, the unsaturated fatty acid has an iodine number of at least 120. According to the present invention, the fatty acid esters are derived from $C_1$-$C_4$ alkanols, wherein the alkyl moiety may be as described above, more preferably from methanol and ethanol and in particular from methanol.

The $C_1$-$C_4$ alkyl esters are preferably obtained from the transesterification of vegetable or animal oils by means of the alkanol. Such processes and products are known in the art and were originally developed to provide products as substitutes for gas oil. As mentioned above, various alkanols can be applied, although it is in particular preferred to employ methanol.

This component (c) provides the low viscosity of the bituminous binder composition that is required for transport and spraying of the bituminous binder composition on the road surface.

The advantage of low viscosity is that it promotes effective wetting of chipping and improves adhesion and embedding of chippings.

Unsaturated fatty acid alkyl esters are good solvents for bitumen and are neither toxic nor harmful to the environment. They have a low viscosity and an ignition point of the order of 200° C. as determined according to ASTM D92 (Cleveland open cup), instead of 50° to 85° C. approximately for petroleum derived organic solvents (thinners) or fluxing oils.

Preferably, the unsaturated fatty acid is derived from an animal or vegetable oil. Vegetable oils result from the grinding up of various kinds of grains or seeds. Among these oils pressed from oily seeds are lineseed, as well as the oil of sunflower, soybean, pumpkin seed, sesam, olive, nuts and maize. The preferred unsaturated fatty acid is derived from rapeseed oil, sunflower oil or isomerised sunflower oil. The alkyl esters used in the invention can also be obtained from animal oils or from other sources. Useful animal fats are Hog's fat, beef tallow and wool fat.

The unsaturated fatty acid comprises a variable number of carbon-carbon double bonds depending on the plant or animal from which the oil originates. The unsaturated fatty acid of the present invention contains preferably at least two carbon-carbon double bonds.

The bituminous binder composition preferably comprises 0.3 to 25.0 wt. %, more preferably 1.0 to 10.0 wt. % and most preferably 2.0 to 8.0 wt. % of the mono-alkyl ester of the vegetable oil or animal oil, based on the total weight of the bituminous binder composition.

The visco-elastic properties of the bituminous binder composition can further be improved using a curing agent. The curing agent comprises a sulfur-donor compound. It can further comprise vulcanisation accelerators, either with or without sulphur-donating features. For further details on these types of vulcanisation accelerators and which can be employed in the constitution of the curing agent, reference is made to U.S. Pat. No. 5,605,946 which is incorporated herein by reference. Also other curing packages commonly used in the rubber industry can be applied. However, it is preferred that the curing agent comprises sulphur, stearic acid or a salt thereof, zinc oxide and/or tetramethyl thiuram disulfide. Such a curing agent is for instance commercially available from Latexfalt B.V., the Netherlands, under the trade name SURMAC® DO.

The bituminous binder composition according to the invention comprises preferably 0.01 to 1.0 wt. % of the curing agent, based on the total weight of the bituminous binder composition and more preferably 0.02-0.5 wt. %.

The amide additive, i.e. component (d) of the bituminous binder composition according to the present invention, is represented by the following formula:

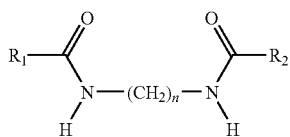

wherein $R_1$ and $R_2$ are independently selected from the group consisting of $C_{10}$-$C_{30}$ alkyl groups and wherein n is an integer from 1 to 4. More preferably, $R_1$ and $R_2$ are selected from the group consisting of $C_{14}$-$C_{20}$ alkyl groups and is n an integer from 2 to 4. Most preferably, n is 2 so that —$(CH_2)_n$— represents an ethylene group. According to the invention, it is most preferred that the amide additive consists essentially of ethylene bis-stearamide, i.e. a commercially available amide additive that is derived from stearic acid. Suitable, commercially available products are for example Kemamide® W-39 of Crompton Corporation, Loxamid® EBS of Henkel KGaA and Crodamid® EBS of Croda. Preferably, component (d) is present in an amount of 0.2 to 4.5 wt. %, based on the total weight of the bituminous binder composition.

It is another object of the present invention to provide a process of producing a bituminous binder composition according the invention. This process comprises the steps of:
(i) mixing components (b) and (c) at a temperature of 50° to 150° C.;
(ii) adding at least a part of the mixture as obtained in step (i) to component (a) that has been preheated to a temperature in the range of 100° to 210° C.;
(iii) adding component (d) to the mixture as obtained in step (ii); and
(iv) optionally adding a curing agent to the mixture as obtained in step (iii).

According to the invention it is preferred to add the curing agent. However, for certain applications, e.g. for export purposes, it may be preferred to provide a first composition comprising components (b) and (c) and a second composition comprising the curing agent, wherein component (d) can be mixed with either the first composition or the second composition.

Components (b) and (c) are mixed until a viscous and homogeneous solution is obtained. The weight ratio of component (b) and component (c) is 50:1 to 1:600, preferably 15:1 to 1:250, more preferably 4:1 to 1:50. most preferably 2:1 to 1:40, based on the total weight of the mixture of components (b) and (c). The weight ratio of component (b) and component (d) is in the range of 50:1 to 1:100, preferably 22.5:1 to 1:45, more preferably 20:1 to 1:22.5, based on the total weight of components (b) and (d).

Dissolving concentrations of up to 20 wt. % of component (b) can be achieved with standard dissolving stirrers which only can apply a limited shear to the mixture while stirring. The temperature is preferably in the range of 50° to 150° C., preferably in the range of 80° to 130° C., in particular because higher temperatures may effect oxidation and polymerisation of component (b) when performed in the presence of air. Hence, it is preferred to perform the dissolving operation in an inert atmosphere, e.g. nitrogen. Homogeneous mixtures with higher concentrations of component (b) can be achieved using high shear dissolving equipment like high shear kneaders, extruders or milling systems.

The mixture obtained in step (i) can be very well processed between a temperature of 50° and 130° C. with commonly used storage, pumping and piping equipment in the bitumen industry, although lower and higher temperatures can be used as well.

In a next step (ii) component (a) is preferably preheated to a temperature in the range of 150° to 200° C., more preferably to 160° to 190° C. To this preheated component (a) at least a part of the mixture as obtained in step (i) is added, the amount depending on the required elasticity of the final bituminous binder composition in surface dressing applications. However, according to the invention it is preferred that all of the mixture as obtained in step (i) is added to component (a).

Preferably, component (a) is modified with only 0.05 to 5.0 wt. % of component (b), more preferably with 0.1 to 3 wt. % and most preferably with 0.2 to 2.0 wt. %, based on the total weight of the bituminous binder composition. Even at these low concentrations of component (b) a high degree of elasticity can be obtained in the final surface dressing system, even when measured immediately after application of the surface dressing binder.

In step (iv) a curing agent according the invention is added to the mixture. After addition of this curing agent the mixture is maintained at a temperature between 100° C. and 210° C., preferably 160° C. to 190° C. while stirring gently. After 60 minutes the product is ready for use. The curing agent is preferably a prepacked curing agent in a meltable or a low-melting plastic bag, e.g. a polyethylene comprising bag.

The bituminous binder composition according to the invention was evaluated in the Standard Test Method for Softening Point of Bitumen using the Ring-and-Ball apparatus (ASTM D-36). In this method the softening point of bitumen from a temperature 30° to 157° C. is determined using a Ring-and-Ball apparatus, e.g. the Tanaka ASP-5 Automated Softening Point Tester, that is immersed in the required solvent: distilled water (30° to 80° C.), USP glycerine (above 80° to 157° C.) or ethylene glycol (30° to 110° C.).

Figure 2:
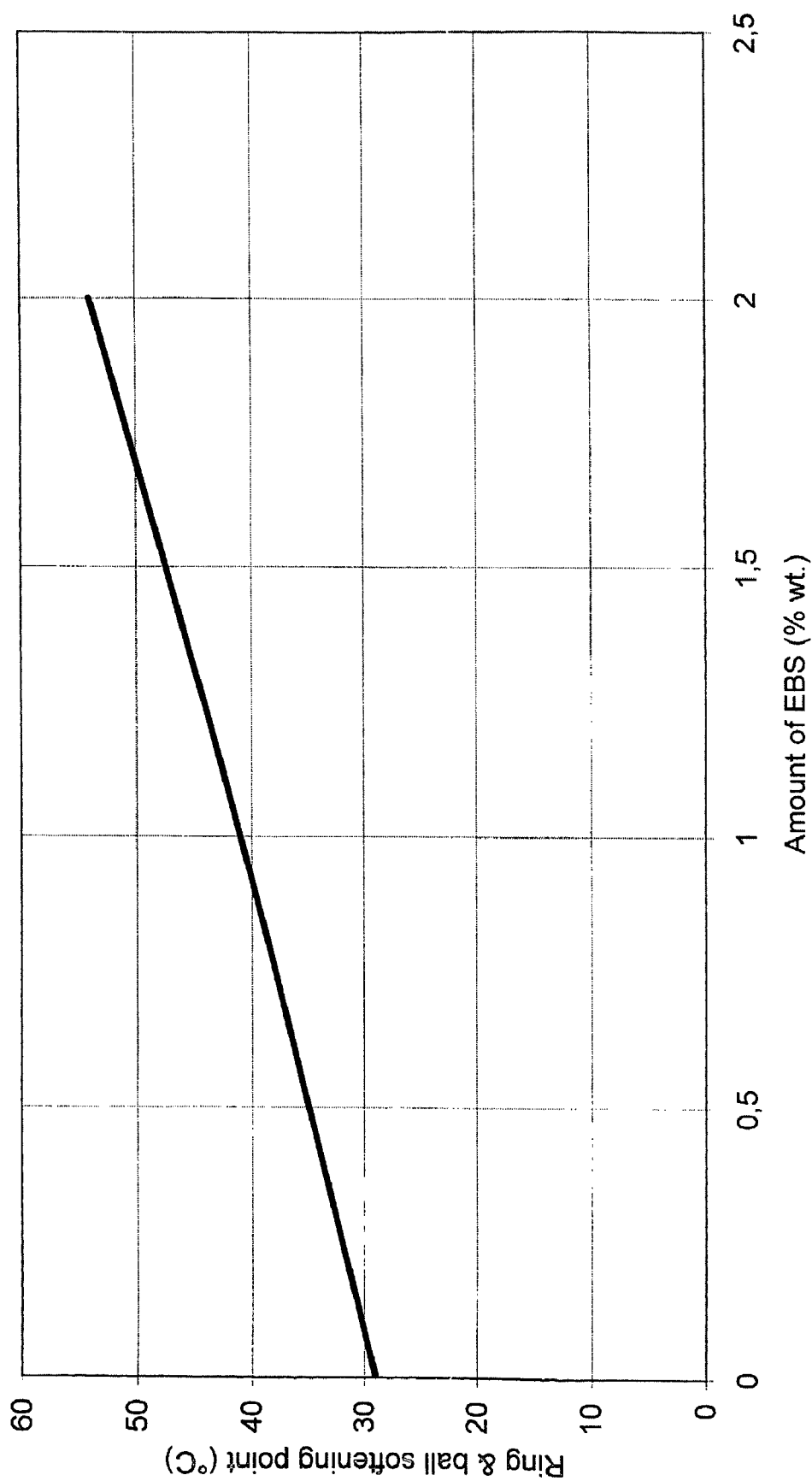
FIG. 2 shows the ring-and-ball softening point of a composition according to the invention as a function of the amount of component (d). Addition of 1.0 wt. % of component (d) results in an increase of 12° C. of the ring-and-ball softening point as determined according to ASTM D 36 (described below).

FIG. 2 shows the softening point of the bituminous binder composition according to the invention as function of the amount of component (d). The addition of 1.0 wt. % of component (d) results in an surprising increase of the softening point of about 12° C. whereas WO 030/062315 discloses an increase of only 4° C. when the same amount of component (d) is added.

The bituminous binder composition according to the invention was also subjected to a comparative Vialit test according to NEN-EN 12272-3 (also known as DIN-EN 122722-3). In this test 40 grams of bitumen is spread over a 20 cm.×20 cm. steel plate. The bituminous binder composition is then placed in a water bath to cool. The plate is removed and 100 aggregate chips are placed on the plate (without touching). The chippings are compacted onto the bitumen covered plate with a 25 kg. rubberised roller. The bitumen plate and chips are returned to the water bath. The plate is inverted on the testing stand and a steel ball is dropped three times onto the plate within ten seconds. An 85% rate is expected. Chips coated with bitumen are considered passing. Those that fall off are counted as failures.

According to the invention the bituminous binder composition is characterised by loss of stone after impact deformation at −10° C. of less than 80% according to the Vialit NEN-EN 12272-3 test, based on a bituminous binder composition.

The present invention further relates to the use of the bituminous binder composition according to the invention in surface dressing, in particular to road construction, road renovation, (cold) joint filling and sealing purposes. The present invention also relates to the use of the bituminous binder composition according to the invention for emulsion applications, which can for example be used in bond coat (or tack coat) applications and industrial e.g. metal protection applications.

The present invention is further illustrated by the following examples. These examples demonstrate the advantages of the bituminous binder composition of the present invention over the prior art compositions. In particular, the composition according to the invention shows a stronger temperature dependence of the viscosity than the prior art compositions. Consequently, the composition according to the invention has an improved processability under road construction conditions (high temperatures, e.g. 180° C.) and a high softening point under ambient conditions without the need of transition metals salts (siccatives) as disclosed in U.S. Pat. No. 6,156,113.

EXAMPLE 1

An amount of rapeseed oil methyl ester (RME), is heated up to 110° C. While stirring under nitrogen an amount of polybutadiene (low-cis grade; 19 parts with respect to RME) is added to obtain a 16% solution by weight. This mixture is stirred until a clear solution is obtained. Seven parts of this mixture were added to hundred parts of preheated (paraffinic) bitumen having a penetration of 160 to 220 (ASTM D5-97). The temperature of the bitumen was between 160° C. and 165° C. This mixture is homogenised for about 30 minutes. Subsequently, an amount of 0.25% by weight of the curing agent Surmac® DO from Latexfalt B.V. is added slowly while the mixture is allowed to react for at least 1 hour at a constant temperature. EBS of technical grade may be added before or after this cross linking step. The amount of EBS needed is 0.75% by weight. Finally an aminofunctional adhesion promotor (Promak Addibit L 100) is added in an amount of 0.3% on the total mass. If desired, this amount may be varied, depending on the aggregate quality used and application conditions. This composition is designated as "high grade" (cf. Example 3).

COMPARATIVE EXAMPLE 1

A mixture was prepared according to the method described in Example 1, provided that no EBS was added.

The dynamic viscosity versus temperature was recorded by using a Rheostress 1 rheometer from Haake with plate-plate configuration. The measurement was started at 120° C. to make the material flow. Some time was allowed for the material to attain a homogeneous temperature and then the viscosity measurement was started. The rotational speed was 300 rpm and the temperature was increased with increments of 10° C. After each temperature increase the temperature was allowed to stabilise before the viscosity was measured.

Curves were obtained as shown in FIG. 1 for the mixtures according to Example 1 and Comparative Example 1. It appears that at lower temperature the viscosity of the mixture according to Example 1 has a lower viscosity, but hat it approaches the viscosity of the mixture according to Comparative Example 1 at higher temperatures.

It can be concluded that EBS has no influence on the viscosity at higher temperatures, i.e. spraying temperatures, but that it decreases viscosity at lower temperatures which explains the good flow and adhesion of this binder and the good embedding of aggregate. Obviously, lower viscosity at lower temperatures is beneficial for transport and workability.

EXAMPLE 2

Two samples of the bituminous binder composition were prepared as described in Example 1 and Comparative Example 1. A third mixture was prepared with an increased amount of EBS (1.75% by weight). The softening point (ring-and-ball) of these samples was determined after 24 hours according to ASTM D-36. The results of these measurements are shown in FIG. 2, which shows a linear increase of softening point with increasing level of EBS. The slope of this line is about 12° C. per % of EBS added.

This strong increase of softening point is found serendipitously. It accounts for the good mechanical properties of the bituminous binder composition according to the invention, also at higher road surface temperatures, and for the resistance against blackening up.

EXAMPLE 3

Two parts of the bituminous binder composition according to Example 1 were added to one part of (paraffinic) bitumen having a penetration of 70 to 100 (ASTM D5-97). The level of additives is restored by adding EBS, RME and Promak Addibit L 100 up to approximately the original level as disclosed in Example 1. This binder is designated "intermediate grade" (lower polymer content). Also, one part of the bituminous binder composition according to Example 1 was added to two parts of (paraffinic) bitumen having a penetration of 70 to 100 (ASTM D5-97). The level of additives again is restored. This mixture is designated "standard grade" (lowest level of polymer). These binders were compared with the composition according to Example 1, the latter being designated "high grade".

The low temperature properties of these three materials were tested in the Vialit test according to NEN-EN 12272-3. One deviation is made from this procedure: as almost all stones released from the plate are stained with bitumen they have to be counted as not sticking in order to discriminate between different materials with this test. If this is not done and they are counted as sticking, most polymer modified binders have the same result of 100% adhering aggregate down to −20° C., experience has learned.

Figure 3:
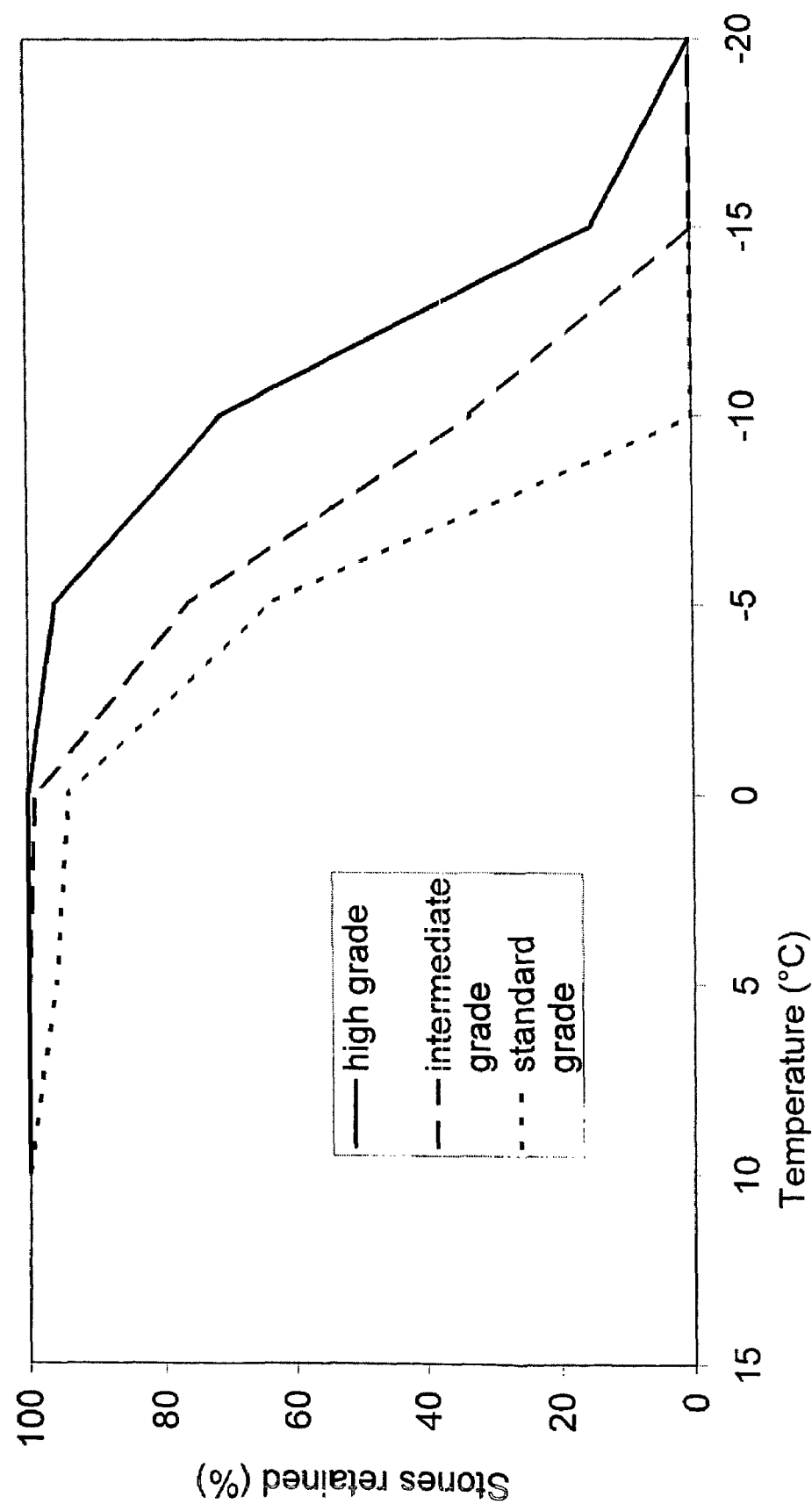
FIG. 3 shows results obtained in the Vialit plate shock test according to NEN EN 12272-3 (described below).

In this way the curves as shown in FIG. 3 were obtained. It is obvious that the performance of the materials in this test increases with increasing level of polymer modification. Thus, it is concluded that even at relatively low concentrations of polymer, the adhesive properties of this type of bituminous binder composition is greatly improved.

The invention claimed is:

1. A bituminous binder composition comprising:
   (a) 60-99.75 wt. % bitumen;
   (b) 0.05-5.0 wt. % of an elastomer;
   (c) 0.1-30.0 wt. % of a mono-alkyl ester of rapeseed oil; and
   (d) 0.1-5.0 wt. % of ethylene bis-stearamide;
   each wt. % based on the total weight of the bituminous binder composition.

2. The bituminous binder composition according to claim 1, wherein the bitumen is a paraffinic or a naphtenic bitumen with an average penetration of 10 to $350 \times 10^{-1}$ mm.

3. The bituminous binder composition according to claim 1, wherein the elastomer is a polymer or a resin comprising two adjacent butadiene units.

4. The bituminous binder composition according to claim 1, wherein the elastomer is a polybutadiene, a butadiene-styrene diblock copolymer, a styrene-butadiene-styrene triblock terpolymer, a isoprene-styrene diblock copolymer, a styrene-isoprene-styrene triblock terpolymer, or a combination thereof.

5. The bituminous binder composition according to claim 3, wherein the elastomer is a polybutadiene, a butadiene-styrene diblock copolymer, a styrene-butadiene-styrene triblock terpolymer, a isoprene-styrene diblock copolymer, a styrene-isoprene-styrene triblock terpolymer, or a combination thereof.

6. The bituminous binder composition according to claim 1, wherein the composition comprises 0.1 to 4.5 wt. % of the elastomer, based on the total weight of the bituminous binder composition.

7. The bituminous binder composition according to claim 1, wherein the bituminous binder composition comprises 0.3 to 25.0 wt. % of the mono-alkyl ester of rapeseed oil, based on the total weight of the bituminous binder composition.

8. The bituminous binder composition according to claim 1, wherein the bituminous binder composition further comprises a curing agent.

9. The bituminous binder composition according to claim 6, wherein the bituminous binder composition further comprises a curing agent.

10. The bituminous binder composition according to claim 7, wherein the bituminous binder composition further comprises a curing agent.

11. The bituminous binder composition according to claim 8, wherein the curing agent is a sulfur-donor compound.

12. The bituminous binder composition according to claim 9, wherein the curing agent is a sulfur-donor compound.

13. The bituminous binder composition according to claim 10, wherein the curing agent is a sulfur-donor compound.

14. The bituminous binder composition according to claim 8 comprising 0.01 to 1.0 wt. % of the curing agent, based on the total weight of the composition.

15. The bituminous binder composition according to claim 9 comprising 0.01 to 1.0 wt. % of the curing agent, based on the total weight of the composition.

16. The bituminous binder composition according to claim 10 comprising 0.01 to 1.0 wt. % of the curing agent, based on the total weight of the composition.

17. A process for preparing a bituminous binder composition comprising the steps of:
   (i) mixing an elastomer and a mono-alkyl ester of rapeseed oil at a temperature of 50° C. to 150° C.;
   (ii) adding at least a part of the mixture as obtained in step (i) to bitumen, the bitumen having been preheated to a temperature in the range of 100° C. to 210° C.;
   (iii) adding ethylene bis-stearamide to the mixture as obtained in step (ii); and
   (iv) optionally adding a curing agent to mixture as obtained in step (iii).

18. The process according to claim 17, wherein the bitumen is a paraffinic or a naphtenic bitumen with an average penetration of 10 to $350 \times 10^{-1}$ mm.

19. The process according to claim 17, wherein the elastomer is a polymer or a resin comprising two adjacent butadiene units.

20. The process according to claim 17, wherein the elastomer is a polybutadiene, a butadiene-styrene diblock copolymer, a styrene-butadiene-styrene triblock terpolymer, a isoprene-styrene diblock copolymer or, styrene-isoprene-styrene triblock terpolymer, or a combination thereof.

21. The process according to claim 19, wherein the elastomer is a polybutadiene, a butadiene-styrene diblock copolymer, a styrene-butadiene-styrene triblock terpolymer, a isoprene-styrene diblock copolymer, a styrene-isoprene-styrene triblock terpolymer, or a combination thereof.

22. The process according to claim 17, wherein the composition comprises 0.1 to 4.5 wt. % of the elastomer, based on the total weight of the bituminous binder composition.

23. The process according to claim 17, wherein the bituminous binder composition comprises 0.3 to 25.0 wt. % of the mono-alkyl ester of rapeseed oil, based on the total weight of the bituminous binder composition.

24. The process according to claim 17, wherein the bituminous binder composition further comprises a curing agent.

25. The process according to claim 22, wherein the bituminous binder composition further comprises a curing agent.

26. The process according to claim 23, wherein the bituminous binder composition further comprises a curing agent.

27. The process according to claim 24, wherein the curing agent is a sulfur-donor compound.

28. The process according to claim 25, wherein the curing agent is a sulfur-donor compound.

29. The process according to claim 26, wherein the curing agent is a sulfur-donor compound.

30. The process according to claim 24, wherein the bituminous binder composition comprises 0.01 to 1.0 wt. % of the curing agent, based on the total weight of the composition.

31. The process according to claim 25, wherein the bituminous binder composition comprises 0.01 to 1.0 wt. % of the curing agent, based on the total weight of the composition.

32. The process according to claim 26, wherein the bituminous binder composition comprises 0.01 to 1.0 wt. % of the curing agent, based on the total weight of the composition.

33. A process for dressing a surface comprising coating the surface with a bituminous binder composition comprising bitumen, elastomer, mono-alkyl ester of rapeseed oil, ethylene bis-stearamide.

34. The process according to claim 33, wherein the surface is selected from the group consisting of roads and joints.

* * * * *

UNITED STATES PATENT AND TRADEMARK OFFICE
CERTIFICATE OF CORRECTION

PATENT NO. : 7,595,356 B2  Page 1 of 1
APPLICATION NO. : 10/598926
DATED : September 29, 2009
INVENTOR(S) : Lommerts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 89 days.

Signed and Sealed this

Twenty-eighth Day of September, 2010

David J. Kappos
*Director of the United States Patent and Trademark Office*